US012570019B2

(12) United States Patent
Bretting et al.

(10) Patent No.: US 12,570,019 B2
(45) Date of Patent: Mar. 10, 2026

(54) ZIG ZAG FOLDER WITH PERFORATOR AND ZIG ZAG FOLDED WEB HAVING PERFORATIONS

(71) Applicants: Richard D. Bretting, Ashland, WI (US); Tad T. Butterworth, Ashland, WI (US); Andrew Kell Balduc, Ironwood, MI (US); Kraig John Trogan, Ashland, WI (US); James Andrew Walsh, Ashland, WI (US); Greg M. Kauppila, Ashland, WI (US)

(72) Inventors: Richard D. Bretting, Ashland, WI (US); Tad T. Butterworth, Ashland, WI (US); Andrew Kell Balduc, Ironwood, MI (US); Kraig John Trogan, Ashland, WI (US); James Andrew Walsh, Ashland, WI (US); Greg M. Kauppila, Ashland, WI (US)

(73) Assignee: C.G. Bretting Manufacturing Co., Inc., Ashland, WI (US)

( * ) Notice: Subject to any disclaimer, the term of this patent is extended or adjusted under 35 U.S.C. 154(b) by 72 days.

(21) Appl. No.: 18/296,106

(22) Filed: Apr. 5, 2023

(65) Prior Publication Data

US 2023/0330882 A1 Oct. 19, 2023

Related U.S. Application Data

(60) Provisional application No. 63/330,500, filed on Apr. 13, 2022.

(51) Int. Cl.

| | |
|---|---|
| ***B26D 7/32*** | (2006.01) |
| ***B26D 5/22*** | (2006.01) |
| ***B26F 1/20*** | (2006.01) |
| ***B65H 35/10*** | (2006.01) |
| ***B65H 45/20*** | (2006.01) |

(52) U.S. Cl.
CPC ................. *B26D 5/22* (2013.01); *B26D 7/32* (2013.01); *B26F 1/20* (2013.01); *B65H 35/10* (2013.01); *B65H 45/20* (2013.01); *B65H 2301/4216* (2013.01); *B65H 2301/5152* (2013.01)

(58) Field of Classification Search
None
See application file for complete search history.

(56) References Cited

U.S. PATENT DOCUMENTS

| | | | | |
|---|---|---|---|---|
| 3,195,882 | A * | 7/1965 | Nystrand | B65H 45/24 493/430 |
| 10,245,874 | B2 | 4/2019 | Menashe et al. | |
| 2003/0125180 | A1 * | 7/2003 | Sosalla | B31F 1/0009 493/423 |

(Continued)

FOREIGN PATENT DOCUMENTS

| | | | |
|---|---|---|---|
| EP | 1443839 | B1 | 12/2014 |
| TW | I17060165 | B | 4/2011 |

*Primary Examiner* — Chinyere J Rushing-Tucker
(74) *Attorney, Agent, or Firm* — Reinhart Boerner Van Deuren P.C.

(57) ABSTRACT

An apparatus and method for forming zig-zag folded logs of web material is provided. The apparatus and method allows for forming logs having different sheet lengths on a same machine. Logs of web material having weakened regions at different locations between folds in the zig-zag folded web are also provided.

24 Claims, 10 Drawing Sheets

(56) References Cited

U.S. PATENT DOCUMENTS

| | | | | |
|---|---|---|---|---|
| 2007/0018373 | A1 * | 1/2007 | Shoji | B65H 45/28 270/4 |
| 2011/0154782 | A1 | 6/2011 | Walsh et al. | |
| 2014/0135192 | A1 * | 5/2014 | Andersson | B65H 45/24 493/356 |

* cited by examiner

ZIG ZAG FOLDER WITH PERFORATOR AND ZIG ZAG FOLDED WEB HAVING PERFORATIONS

CROSS-REFERENCE TO RELATED PATENT APPLICATIONS

This patent application claims the benefit of U.S. Provisional Patent Application No. 63/330,500, filed Apr. 13, 2022, the entire teachings and disclosure of which are incorporated herein by reference thereto.

FIELD OF THE INVENTION

This invention generally relates to an apparatus for forming logs of zig-zag folded web of material, methods for forming the logs, and logs of zig-zag folded web of material.

BACKGROUND OF THE INVENTION

Today's tissue/towel folding equipment for forming sheets of web material is limited to distinct cutoff lengths determined by the diameter of processing rolls used to form the length of the sheets and to form the folds in the sheets.

Some exceptions exist such as U.S. Pat. No. 10,308,469 to Kauppila that uses ditches formed in the outer diameter of the processing roll or rolls to adjust the length of material that is carried by the processing roll. Thus, a length of the sheet can be adjusted by determining if or how much material is received in the ditches.

European Patent EP 1 826 165 to DeMatteis discloses forming folded sheets using modular systems that allows for swapping between different sets of processing rolls such as different diameter cutting rolls or different diameter folding rolls so as to process different length sheets.

U.S. Pat. No. 7,717,839 to Butterworth discloses a machine that can form sheets having different numbers of panels such as being able to form, for example, sheets having three panels or sheets having four panels.

Typically, however, the cutoff of the sheets is always a multiple of the panel width that the folding rolls are designed to produce. This leaves very little to no flexibility for changes on the machine to form different length sheets without wholesale changes to the system or by requiring duplication of numerous complex components of the system such as duplication of various processing rolls including but not limited to duplicate folding rolls or duplicate cutting rolls.

However, there is a need in the folded web material industry for flexibility in forming different lengths sheets on a single machine. For example, some distributors or retailers want to have unique offerings to differentiate themselves from their competitors. For example, one distributor or retailer may want sheet lengths of twelve inches while another distributor or retailer may want a different sheet length such as ten inches so as to provide cost savings or to differentiate their product.

With reference to FIG. 1, when the product is a rolled product 10, another problem relates to the amount of wasted space within the shipping package 12 due to the hollow central cavity 14, typically due to the inclusion of core 16, and the empty volume 18 that surrounds the circular circumference of the rolled product 10. In some instances, twenty-eight percent or more of the volume of the shipping package 12 is empty space. This causes significant inefficiencies and costs for shipping, storing, and displaying in retail environments the rolled product 10.

The invention provides improvements over the current state of the art for forming web product into predetermined length sheets.

BRIEF SUMMARY OF THE INVENTION

New and improved apparatuses for forming zig-zag folded logs of web material are provided. New and improved zig-zag folded logs of web material are provided. Methods of using the apparatuses as well as forming the zig-zag folded logs of web material are provided.

In one example, a folding apparatus for separating a web of material into lengths of web material and for zig-zag folding the lengths of web material to form logs is provided. Each log has a continuous zig-zag folded web of material formed from the length of web material. The continuous zig-zag folded web of material has a lead end and a trailing end. The continuous zig-zag folded web of material has a plurality of interconnected panels including a lead panel, a trailing panel, and a plurality of intermediate panels. Adjacent panels are interconnected by a fold. The lead end of the continuous zig-zag folded web of material is provided by the lead panel. The trailing end of the continuous zig-zag folded web of material is provided by the trailing panel. Each log has a plurality of delimited interconnected sheets. Adjacent ones of the plurality of delimited interconnected sheets are delimited by a weakened region formed in the continuous zig-zag folded web of material between the lead end and the trailing end. The apparatus includes a sheet delimiting apparatus; a weakened region breaker; and a folding arrangement. The sheet delimiting apparatus receives the web of material and creates weakened regions in the web of material to delimit adjacent sheets from one another. The sheet delimiting apparatus is adjustable to adjust a spacing between adjacent weakened regions to adjust a length of sheets formed in the web of material. The weakened regions are not complete breakage of the web of material. The folding arrangement forms folds for zig-zag folding the web of material into a plurality of interconnected panels with adjacent panels being connected by a fold therebetween. The weakened region breaker breaks the web of material at selected ones of the weakened regions to separate lengths of web material from the web of material. Each length of web material has a predetermined number of sheets. Each length of web material, after the web thereof has passed through the folding arrangement and the weakened region breaker, has a lead panel, a trailing panel and a plurality of intermediate panels to form each length of web material into a continuous zig-zag folded web of material.

In one example, the weakened region breaker is upstream of the folding arrangement such that the lengths of web material are formed prior to passing through the folding arrangement.

In one example, the weakened region breaker is downstream from the folding arrangement.

In one example, the weakened region breaker is in the form of a log separator used to separate one log of zig-zag folded web material that has fully exited the folding arrangement from the upstream web of material passing through the folding arrangement.

In one example, the weakened region breaker is part of the folding arrangement.

In one example, the weakened region breaker is in the form of at least one projection carried by a folding roll of the folding arrangement.

In one example, the at least one projection is in the form of at least one mechanical tucker.

In one example, the lead panel has a first panel width measured between the lead end and a first fold. The trailing panel has a second panel width measured between the trailing end and a last fold. Each intermediate adjacent panel has a third panel width measured between adjacent folds. The first, second and third panel widths are substantial equal.

In one example, the lead panel has a first panel width measured between the lead end and a first fold. The trailing panel has a second panel width measured between the trailing end and a last fold. Each intermediate adjacent panel has a third panel width measured between adjacent folds. The first, second and third panel widths are different. In one example, the first or second panel width is less than the third panel width. This may occur when it is desired to have a lead end or a trailing end in the middle of the log to make it easier to grab the free end of the web of material when loading the log into a dispenser.

In such an instance, this shortened panel may be formed after passing through the folding arrangement by fingers used to separate adjacent logs from one another.

In such an instance, the folding arrangement may only form panel widths that are substantially all the same and the shorter panels are formed after passing through the folding arrangement by folding an otherwise leading or trailing panel into two smaller panels formed between the adjacent free end and the first or last fold.

In one example, the selected ones of the weakened regions where the lengths of material are separated from the web of material are formed in the web of material at locations where the folding arrangement would have otherwise formed a fold.

In one example, the folding apparatus includes a pair of counter-rotating folding rolls. The counter rotating folding rolls include at least one set of a cooperating tucker and gripper for forming the folds. In one example, the tucker has at least one vacuum port adjacent thereto for securing the lengths of web material to the folding rolls. The weakened region breaker breaks the lengths of web material from the web material at a weakened region that would align with the tucker having the vacuum port such that the lead end of the length of web material aligns with the vacuum port of the tucker.

In one example, the tucker is a mechanical tucker and the gripper is a mechanical gripper. The tucker has at least one vacuum port adjacent thereto for securing the lengths of web material to the folding rolls.

In one example, the tucker is a vacuum tucker formed by a tucker vacuum port and the gripper is a vacuum gripper formed by a gripper vacuum port.

In one example, one of the folding rolls includes both a vacuum tucker and a vacuum gripper and the other one of the folding rolls only includes a vacuum gripper.

In one example, the continuous zig-zag folded web of material forms a stack of panels after exiting the folding arrangement. The folding arrangement forms the folds into alternating A and B folds. The A folds form one side of the stack of the panels and the B folds form an opposite side of the stack of panels. The A-folds open towards the B folds and the B folds open towards the A folds. The weakened region breaker only breaks the web of material at weakened regions, which if not broken, would have formed an A fold exiting the folding arrangement.

Notably, the free end could be at an intermediate location in the instances where a shorted lead or trailing panel is formed.

In one example, the sheet delimiting apparatus forms a first weakened region between a pair of adjacent folds. The adjacent folds forms a first panel. The first weakened region is offset from both of the folds in the pair of adjacent folds forming the first panel.

In one example, the sheet delimiting apparatus is configured to create the weakened regions at a spacing that is not an even multiple of the panel width of the intermediate panels defined between adjacent folds.

In one example, the sheet delimiting apparatus is a perforator.

In one example, the sheet delimiting apparatus is a scoring device.

In one example, the weakened region breaker is in the form of a roll configured to interact with the web of material and break the web of material at a selected weakened region.

In one example, the weakened region breaker includes an oversped pad to accelerate a portion of the web of material downstream of the weakened region to stretch the web of material and to break the weakened region.

The oversped pad will, in one example, accelerate the trailing end of the downstream length of material.

In one example, the weakened region breaker includes a finger or knife extending out of the roll that breaks the web of material at the selected weakened region.

In one example, the weakened region breaker includes a finger or knife extending out of an adjacent roll that extends into a groove on the roll to push the selected weakened region into the groove to break the continuous web of material.

In one example, the folding arrangement is a set of counter rotating folding rolls.

In one example, the continuous zig-zag folded web of material has a predetermined number of sheets.

In one example, each panel has a panel width measured generally perpendicular to an adjacent fold. The weakened region breaker breaks the web of material such that the corresponding lengths of web material have a predetermined number of sheets.

In one example, when the spacing between adjacent weakened regions is an even number of panel widths (assuming that the leading and trailing panels have the same width as the intermediate panels), the predetermined number of sheets is a multiple of 1; when the spacing between adjacent weakened regions is an odd number of panel widths (assuming that the leading and trailing panels have the same width as the intermediate panels), the predetermined number of sheets is a multiple of 2; when the spacing between adjacent weakened regions is not an integer multiple of the panel width (assuming that the leading and trailing panels have the same width as the intermediate panels), the predetermined number of sheets must be a multiple of the least common multiple of (2*the panel width, the spacing) divided by the spacing.

In one example, the weakened region breaker is configured to break the web of material at a weakened region such that the number of panels is an even number and that consecutive logs have the same number of sheets.

In another example, a log of a continuous zig-zag folded web of material is provided. The log includes a length of web material. The length of web material has a plurality of interconnected panels and a first offset weakened region. The plurality of interconnected panels including a lead panel, a trailing panel and a plurality of intermediate panels to form the length of web material into a continuous zig-zag folded web of material and a plurality of folds. Each fold interconnects adjacent panels. The first offset weakened region is formed between the leading panel and the last panel. The first offset weakened region is located between and offset from a first adjacent pair of folds.

In one example, the lead panel has a first panel width measured between the lead end and a first fold. The trailing panel has a second panel width measured between the trailing end and a last fold. Each intermediate adjacent panel has a third panel width measured between adjacent folds. The first, second and third panel widths are substantial equal.

In one example, the lead panel has a first panel width measured between the lead end and a first fold. The trailing panel has a second panel width measured between the trailing end and a last fold. Each intermediate adjacent panel has a third panel width measured between adjacent folds. The first, second and third panel widths are different. In one example, the first or second panel width is less than the third panel width. This may occur when it is desired to have a lead end or a trailing end in the middle of the log to make it easier to grab the free end of the web of material when loading the log into a dispenser.

In some instances, this will result in two shorter panels. The width of these two shorter panels combined may equal the width of an intermediate panel. For counting purposes, these two shorter panels, in some instances, may be considered a single panel as the required fold is typically formed by a different means than the folding apparatus of zig-zag folding the intermediate panels.

In one example, the weakened region is a perforated region.

In one example, the first adjacent pair of folds between which the first weakened region is formed includes a first fold and a second fold. The first weakened region is spaced a first distance from the first fold. The first weakened region is spaced a second distance from the second fold.

In one example, the second distance is different than the first distance.

In one example, the length of web material has a second weakened region formed between and offset from a second adjacent pair of folds including a third fold and a fourth fold. The second weakened region is spaced a third distance from the third fold. The second weakened region is spaced a fourth distance from the fourth fold. The third and fourth distances are different than first and second distances.

In one example, the length of web material has a plurality of weakened regions. The first offset weakened region is one of the plurality. The plurality of weakened regions define sheets. Each sheet has a same sheet length.

In an example, a method of forming a log of continuous zig-zag folded web of material is provided. The method includes forming, using the sheet delimiting apparatus, first weakened regions in the web of material. The first weakened regions are formed at a first spacing to define sheets of a first sheet length. The method includes breaking, with the weakened region breaker, the web of material at selected ones of the first weakened regions forming a first plurality of separate lengths of web material from the web of material. Each length of web material of the first plurality of separate lengths of web material has a plurality of sheets of the first sheet length. The method includes zig-zag folding, with the folding arrangement, each of the first plurality of separate lengths of web material into a plurality of interconnected panels including a lead panel, a trailing panel and a plurality of intermediate panels to form each length of web into a continuous zig-zag folded web of material. Adjacent panels are connected by a fold therebetween.

The method includes forming, using the sheet delimiting apparatus, second weakened regions in the web of material. The second weakened regions are formed at a second spacing to define sheets of a second sheet length. The second spacing being different than the first spacing. The method includes breaking, with the weakened region breaker, the web of material at selected ones of the second weakened regions forming a second plurality of separate lengths of web material from the web of material. Each length of web material of the second plurality of separate lengths of web material having a plurality of sheets of the second length. The method includes zig-zag folding, with the folding arrangement, each of the second plurality of separate lengths of web material into a plurality of interconnected panels including a lead panel, a trailing panel and a plurality of intermediate panels to form each length of web into a continuous zig-zag folded web of material. Adjacent panels being connected by a fold therebetween.

In one example, for both the lengths of web material with the first and the second sheet lengths, the lead panel has a first panel width measured between the lead end and a first fold. The trailing panel has a second panel width measured between the trailing end and a last fold. Each intermediate adjacent panel has a third panel width measured between adjacent folds. The first, second and third panel widths are substantial equal.

In one example, at least the intermediate panels of the first lengths of web material have the same panel widths as intermediate panels of the second lengths of web material.

In one example, the method includes adjusting operation of the sheet delimiting apparatus to adjust between the first and second spacing.

In one example, adjusting operation includes adjusting timing of the operation of the sheet delimiting apparatus.

In one example, adjusting operation includes adjusting a speed at which a delimiting roll rotates.

In one example, forming the first weakened regions in each first length of web material includes forming a first offset weakened region between the leading panel and the last panel. In one example, the first offset weakened region is located between and offset from a first adjacent pair of folds.

In one example, the step of forming the first weakened regions and forming the second weakened regions includes perforating the web of material.

In one example, the first adjacent pair of folds between which the first offset weakened region is formed includes a first fold and a second fold. The first offset weakened region is spaced a first distance from the first fold. The first offset weakened region is spaced a second distance from the second fold.

In one example, the second distance is different than the first distance.

In one example, forming the second weakened regions includes forming a second offset weakened region formed between and offset from a second adjacent pair of folds including a third fold and a fourth fold. The second offset weakened region is spaced a third distance from the third fold. The second offset weakened region is spaced a fourth distance from the fourth fold. The third and fourth distances are different than first and second distances.

In an example, a method of forming a log of continuous zig-zag folded web of material is provided. The method includes forming, using a sheet delimiting apparatus, first weakened regions in the web of material. The first weakened regions are formed at a first spacing to define sheets of a first sheet length. The method includes breaking, with a weakened region breaker, the web of material at selected ones of the first weakened regions forming a first plurality of separate lengths of web material from the web of material. Each length of web material of the first plurality of separate lengths of web material has a plurality of sheets of the first sheet length. The method includes zig-zag folding, with a folding arrangement, each of the first plurality of separate lengths of web material into a plurality of interconnected panels including a lead panel, a trailing panel and a plurality of intermediate panels to form each length of web into a continuous zig-zag folded web of material. Adjacent panels are connected by a fold therebetween. The lead panel has a first panel width measured between the lead end and a first fold, the trailing panel has a second panel width measured between the trailing end and a last fold. Each intermediate adjacent panel has a third panel width measured between adjacent folds. Forming the first weakened regions in each first length of web material includes forming a first offset weakened region between the leading panel and the last panel. The first offset weakened region is located between and offset from a first adjacent pair of folds.

In one example, the first, second and third panel widths are substantially equal. In other examples, the lead and trailing panels may be shorted panels as outlined above or be a full width panel with an intermediate fold to provide a shortened width panel.

In one example, the step of forming the first weakened regions and forming the second weakened regions includes perforating the web of material.

In one example, the first adjacent pair of folds between which the first offset weakened region is formed includes a first fold and a second fold. The first offset weakened region is spaced a first distance from the first fold. The first offset weakened region is spaced a second distance from the second fold.

In one example, the second distance is different than the first distance.

In one example, the method includes forming a plurality of second weakened regions having a second spacing different than the first spacing. The plurality of second weakened regions includes a second offset weakened region formed between and offset from a second adjacent pair of folds including a third fold and a fourth fold. The second offset weakened region is spaced a third distance from the third fold. The second offset weakened region is spaced a fourth distance from the fourth fold. The third and fourth distances being different than first and second distances.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
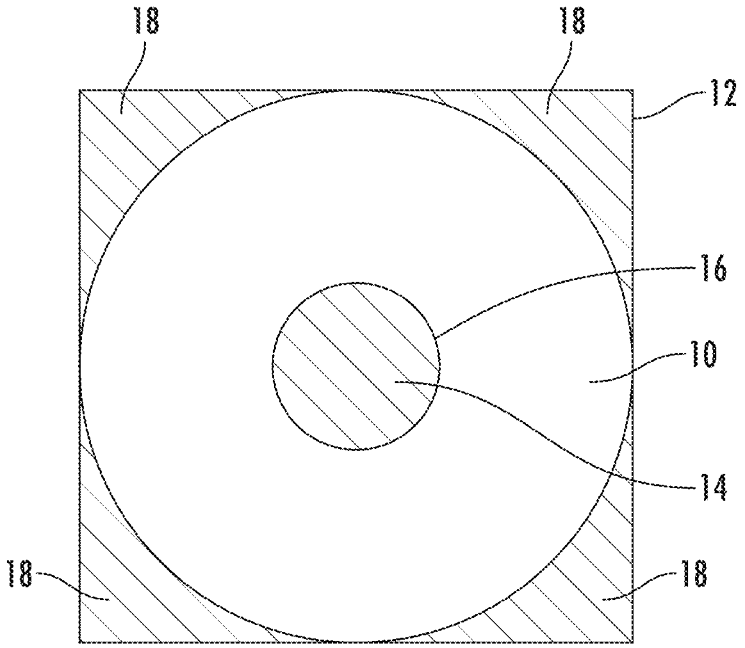
FIG. 1 is a simplified schematic illustration illustrating the wasted air volume when shipping rolled napkin/paper towel product.
Figure 2:
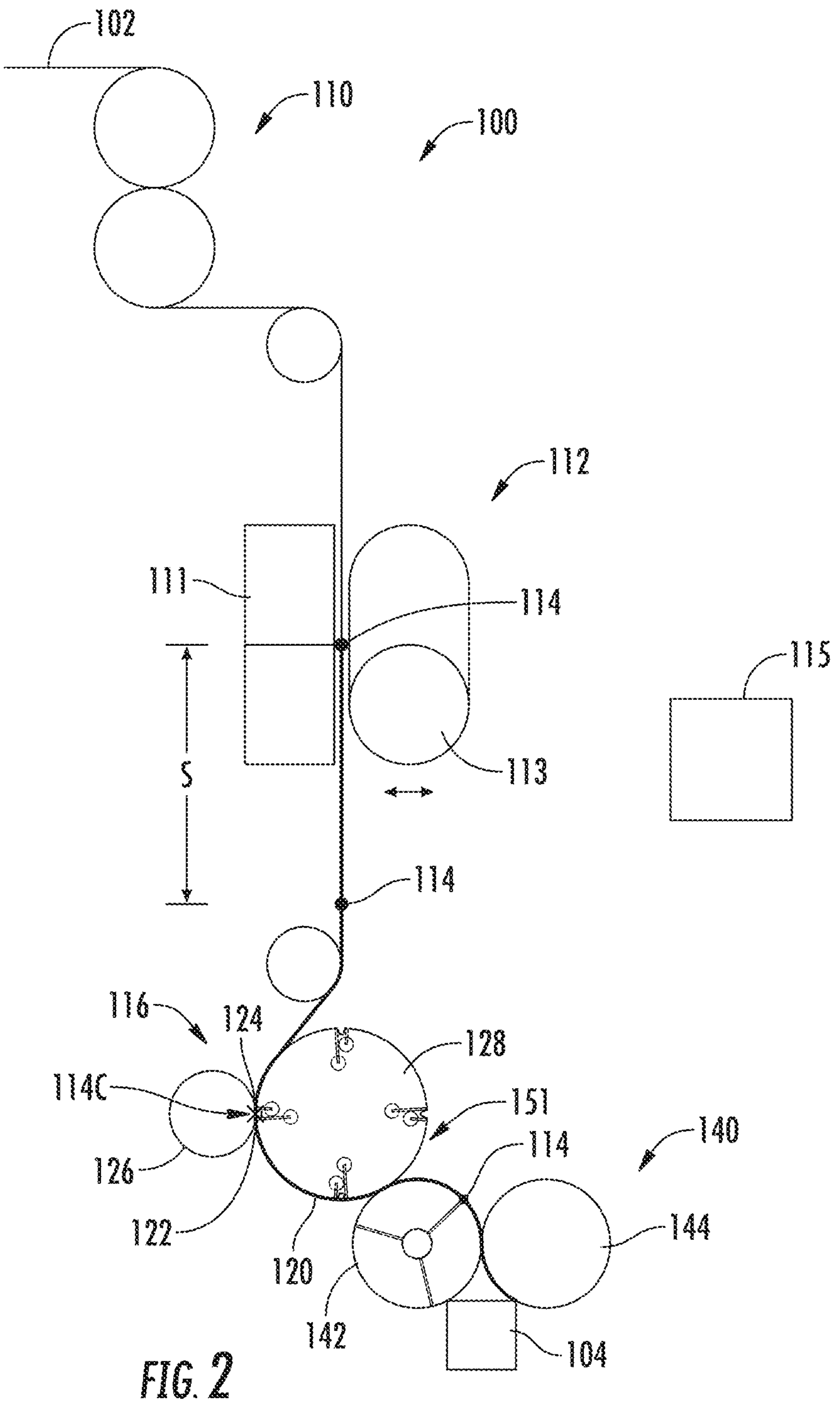
FIG. 2 is a simplified schematic illustration of a folding apparatus for forming logs having zig-zag folded web material.

FIG. 2 is a schematic illustration of a folding apparatus 100 for processing a web of material 102 into a plurality lengths of web material and then zig-zag folding the lengths of web material to form zig-zag folded lengths of web material. Each zigzag folded length of web material forming a log 104 of stacked panels.

The folding apparatus 100 includes a web feed arrangement 110 that feeds the web of material 102.

A sheet delimiting arrangement 112 receives the web of material 102. The sheet delimiting arrangement 112 forms spaced apart weakened regions 114 in the web of material 102. The weakened regions 114 do not fully sever the web of material 102 such that it remains a continuous web after passing through the sheet delimiting arrangement 112. However, the weakened regions 114 allow a user to separate a selected portion (e.g. one or more sheets) from the remaining portion of the log 104.

The weakened regions 114, among other things, delimit the web of material into sheets and the spacing S between adjacent weakened regions 114 defines a sheet length.

In one example, the sheet delimiting arrangement 112 is in the form of a perforator that forms a plurality of perforations across the web of material from side-to-side to define adjacent sheets. The weakened region 114 is thus a perforation in such an example. In an even more particular arrangement, the perforator is a helical blade perforator. Further, in one example, the helical blade perforator may be adjustable relative to the path along which the web of material 102 passes through the perforator so as to accommodate different web speeds through the perforator.

In some examples, the perforator will have a rotating roll 113 that carries the helical blade that will cooperate with an anvil 111 to form the perforations in the web of material. The angle of the anvil and/or the rotating roll 113 may be adjustable relative to the web of material. For example, the rotating roll 113 that carries the helical blade and/or the anvil 111 may be carried in a canting frame for adjusting the orientation thereof relative to the web of material.

However, in other examples, the sheet delimiting arrangement could take the form of a scoring machine that scores the web of material 102. Alternatively, the sheet delimiting arrangement could crimp the web of material to locally weaken the web of material to form the weakened regions 114.

In a preferred example, operation of the sheet delimiting arrangement 112 is adjustable such that the spacing S between adjacent weakened regions 114 can be varied depending on the desired sheet length to be provided. Thus, the sheet delimiting arrangement 112 can be used to form logs having sheets of a first length and then can be adjusted to form logs having sheets of a second length different than the first length.

The adjustability may be provided by a controller 115 operably coupled to the sheet delimiting arrangement 112, for example, the controller 115 could control the orientation of the sheet delimiting arrangement 112 relative to the web of material 102. Further, the controller 115 can control when the sheet delimiting arrangement 112 forms a weakened region 114. In some examples, the controller 115 can control either the speed of the web of material through the sheet delimiting arrangement or the timing of actuation of the sheet delimiting arrangement 112. The controller 115 can control electronic, hydraulic, pneumatic actuators to adjust operation of the sheet delimiting arrangement 112.

In one example, the rotating roll of the sheet delimiting arrangement 112 is controlled by controller 115 such that it has a rotational surface speed parallel to the flow path of the web of material 102 that is different than the speed of the web material 102 through the sheet delimiting arrangement 112. The rotational speed of the rotating roll can be rotated faster than the web material 102 to create shorter sheet lengths. In such an arrangement, the web of material may slide across an outer periphery of one or more of the components of the sheet delimiting arrangement 112 and typically across an outer periphery of the rotating roll 113. In alternative operations, the rotational speed of the rotating roll can be rotated slower than the web material 102 to create longer sheet lengths.

After passing through the sheet delimiting arrangement 112, the web of material 102, which now includes the weakened regions 114, passes through a weakened region breaker 116 where the web of material 102 is broken at a selected one of the weakened regions 114C, illustrated as an X in FIG. 2. Breaking the web of material 102 at the selected weakened region 114C forms lengths of web material 120 having a predetermined length. In FIG. 2, a single length of web material 120 is illustrated.

Breaking the web of material 102 forms a trailing end 122 in the length of web material 120 and a leading end 124 the immediately following length of web material that will be formed from the web of material 102.

Figure 3:
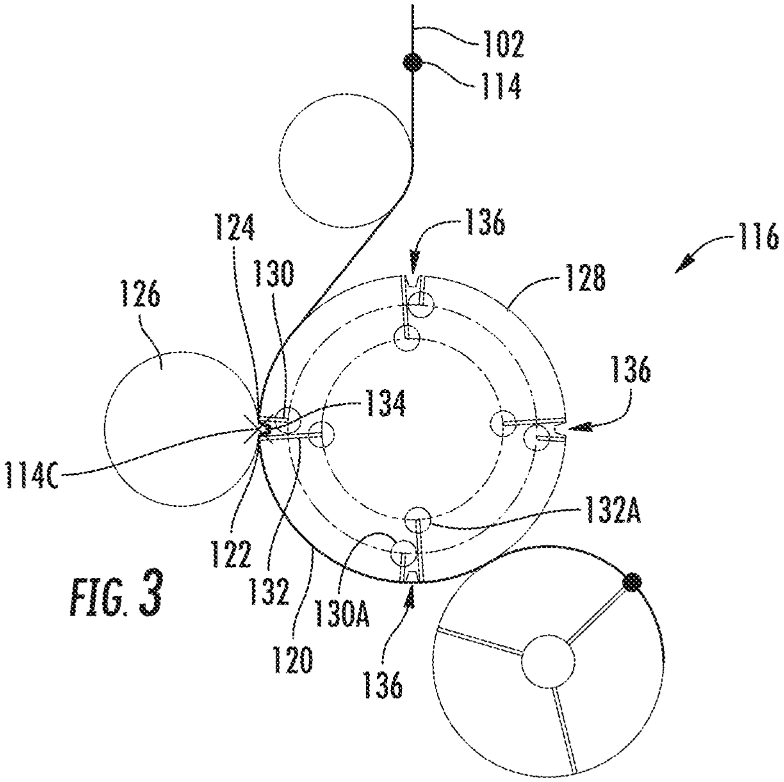
FIG. 3 is an enlarged simplified schematic illustration of a weakened region breaker for separating lengths of web material from the supplied web of material with the web of material passing therethrough.
Figure 4:
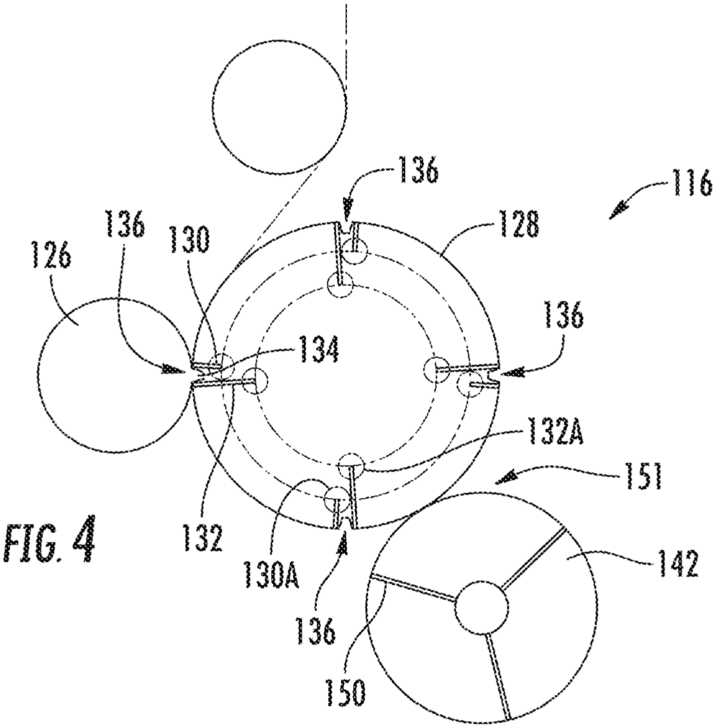
FIG. 4 illustrates the weakened region breaker of FIG. 3 without any web material passing therethrough for clarity purposes.

With reference to FIGS. 3 and 4, the weakened region breaker 116 may take different forms. In the illustrated embodiment, the weakened region breaker 116 is formed by first and second counter rotating rolls 126, 128.

In this example, the weakened region breaker 116 is timed relative to the weakened regions 114, and particularly weakened region 114C, such that the lead end 124 aligns with vacuum port 130 that extends to the surface of second roll 128 while trailing end 122 of the downstream length of web material 120 has its trailing end 122 aligned with vacuum port 132 that also extends to the surface of second roll 128. This keeps the leading end 124 and the trailing end 122 under control and gripped by second roll 128.

In other examples, mechanical gripping rather than vacuum may be used to secure the leading end 124 controlled by the corresponding rolls.

In this example, first roll 126 includes a finger 134 that pushes the weakened region 114C into a ditch 136 formed in the second roll 128. This stretches and breaks the weakened region 114. As this occurs, vacuum is supplied to ports 130, 132 to secure the newly formed trailing and leading ends 122, 124.

In other examples, the second roll is all that is required and it may include a finger or knife that is pushed out of the second roll to stretch the web of material 102 and pop the weakened region 114C. Again, vacuum can be used to secure the newly formed ends.

In another example, the first roll may be oversped relative to the web of material 102. A pad or other structure carried by the oversped first roll 126 will grip the tailing end portion of the length of web material 120 being formed downstream of the weakened region and accelerate the tailing end portion of the length of web material 120 forward/downstream. This will stretch the weakened region 114C and cause it to break severing the length of web material 120 from the web of material 102. Overspeeding in this direction does not remove the leading end 124 from the corresponding vacuum port 130 which could occur if the leading end 122 were slowed rather than accelerating the trailing end 124. Further as the downstream portion of the length of web material 120 is already secured by the second roll 128, such as at vacuum ports 130A, 132A, affecting the position of the trailing end 122 has less effect on control of the relevant portions of the web material by the second roll 128.

In an example, the first roll may be a bar that has the gripping portions of the pad extending radially outward therefrom.

Figure 5:
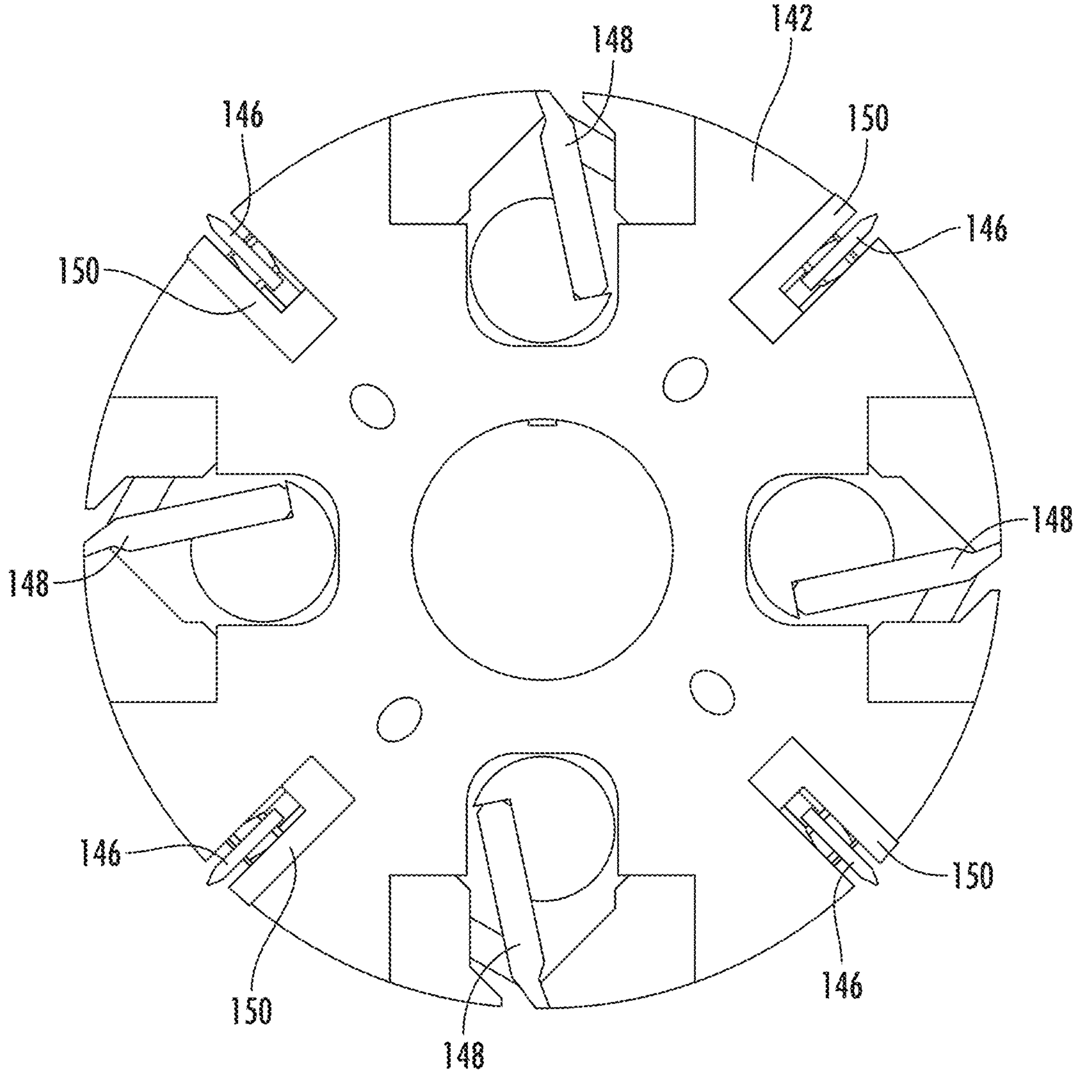
FIG. 5 is an enlarged schematic illustration of one of a pair of counter rotating folding rolls of the folding arrangement of FIG. 2.

With reference to FIG. 2, the lengths of web material 120 are transferred from the weakened region breaker 116 to a folding arrangement 140 that is illustrated in the form of first and second counter rotating folding rolls 142, 144. FIG. 5 illustrates an enlarged example of the first folding roll 142.

In this example, the lengths of web material 120 are transferred by turning on and off vacuum in the adjacent rolls of the weakened region breaker 116 and the folding arrangement 140.

However, other mechanisms for transferring the lengths of web 120 are contemplated. For example, system such as those illustrated in U.S. Pat. No. 7,452,321; US Publ. No. 2007/0203007; or U.S. Pat. No. 7,442,157, the teachings and disclosures of which are incorporated herein by reference thereto, could be used for transferring lengths of web material 120 to the folding arrangement 140. For example, systems that utilize belts and/or guides and corresponding drive rollers could be used. The lengths of web material 120 need not be directly transferred from the weakened region breaker 116 to the rolls of the folding arrangement 140.

In this example, the folding rolls 142, 144 include tuckers 146 and grippers 148 for grabbing the length of web material 120 and forming folds therein. A tucker 146 from the first folding roll 142 aligns with and cooperates with a gripper

148 from the second folding roll as the tucker 146 and gripper 148 pass through the nip between the first and second folding rolls 142, 144.

In one example, the leading end 124 of a given length of web material 120 is transferred from the second roll 128 to the first folding roll 142 at a nip 151 formed therebetween. The leading end 124 is transferred to a tucker 146 and a vacuum port 150 adjacent thereto. Thus, vacuum ports 130 proximate ditches 136 align with a tucker 146 and vacuum port 150 as the components transition through the nip 151 formed therebetween.

Figure 6A:
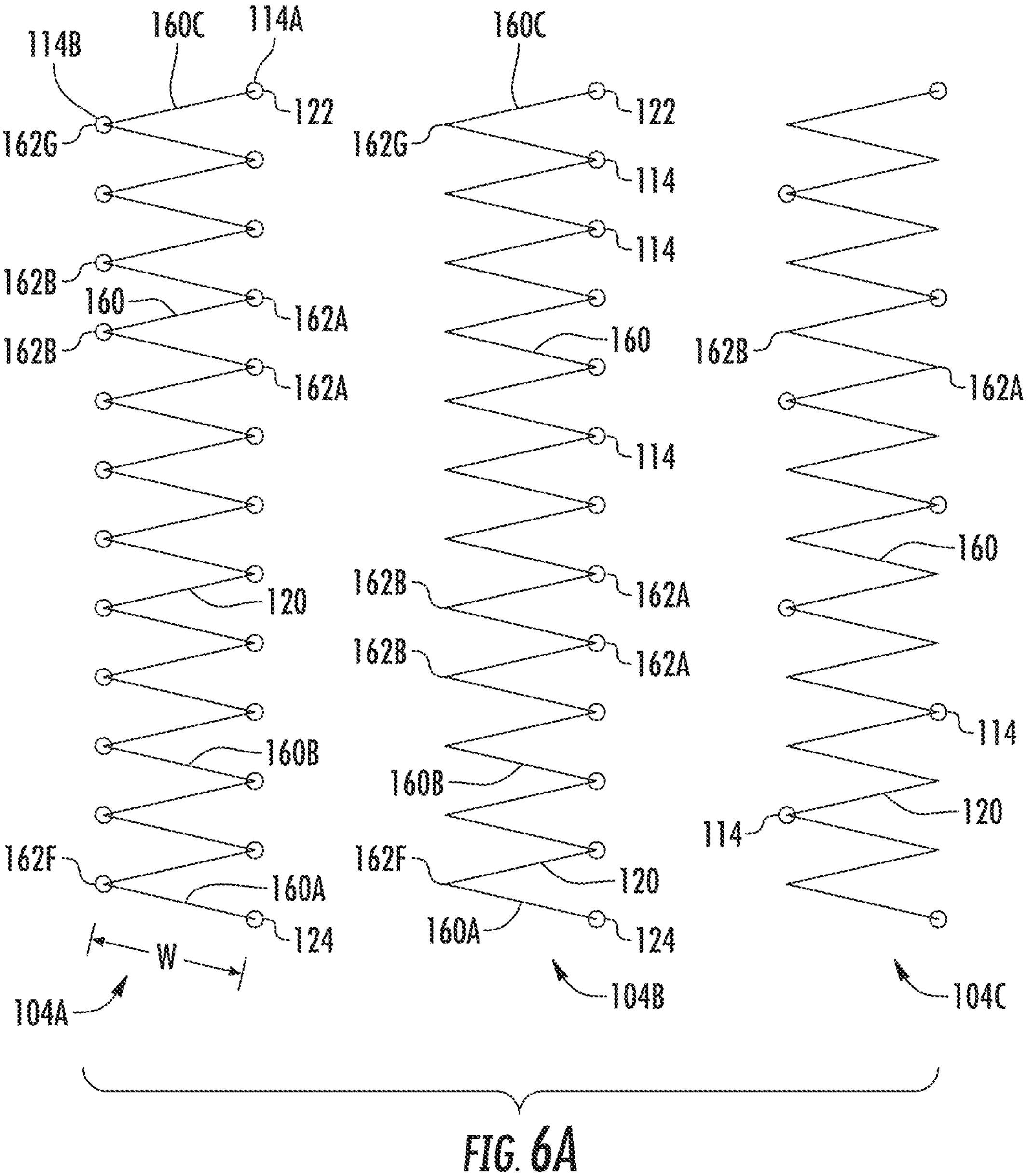
FIGS. 6A and 6B include schematic illustrations of different log configurations that can be formed using the same folding apparatus of FIG. 2 but that have different sheet lengths.
Figure 6B:
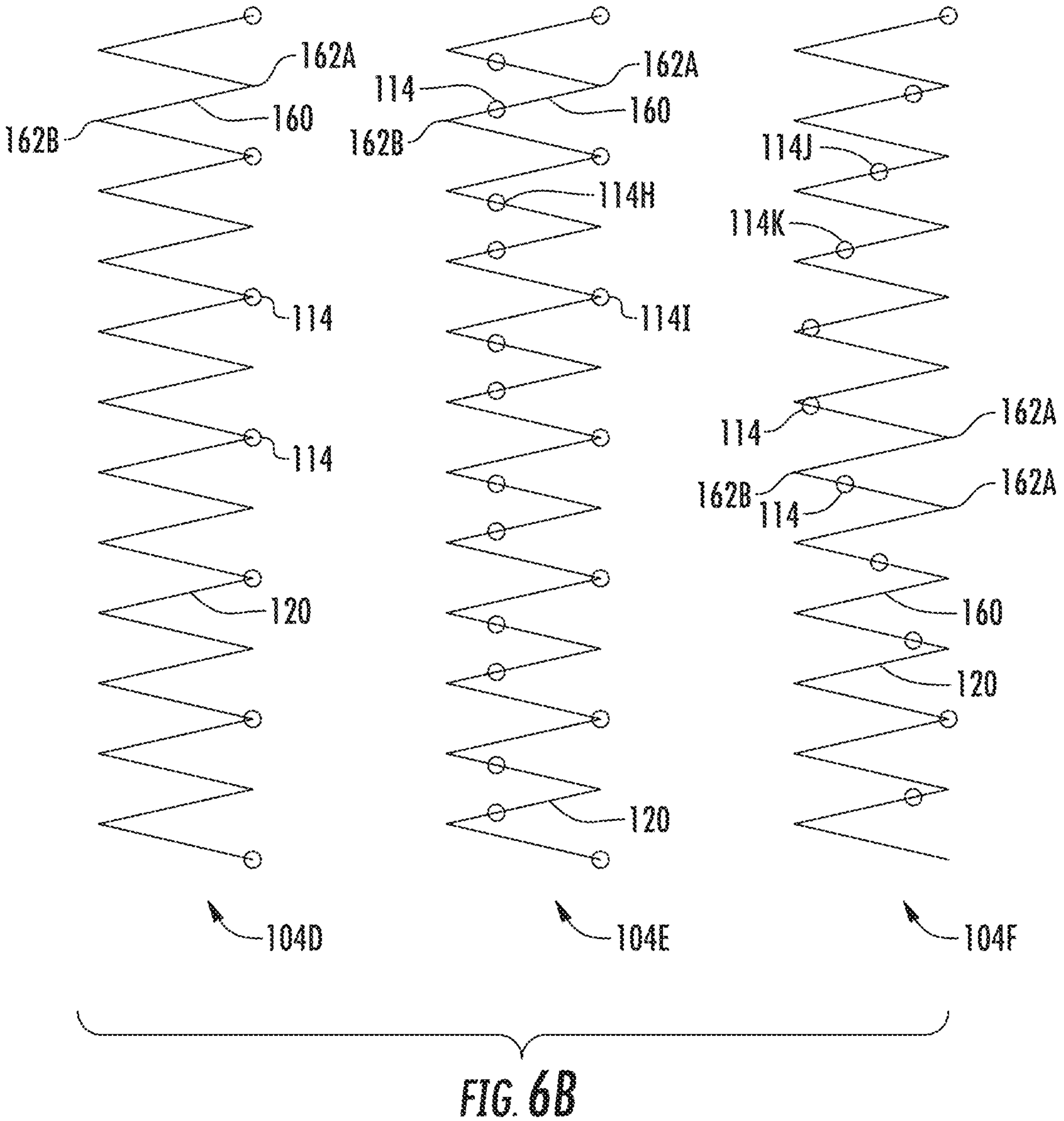

The tuckers and grippers 146, 148 of each folding roll 142, 144 alternate when moving circumferentially around the rolls 142, 144. This alternating orientation forms alternating directing A and B folds 162A, 162B (see e.g. FIG. 6A) in the length of web material 120. A panel 160 of web material is formed between adjacent alternating A and B folds 162A and 162B. Each fold 162 interconnects a pair of adjacent panels 160. The alternating A and B folds 162A, 162B provide the zig-zag configuration to the length of web material. FIGS. 6A and 6B illustrate a plurality of different logs 104A-F in schematic form. In particular, gaps between adjacent panels 160 would typically not exist or not to the extent illustrated. The gaps are simply for illustrative purposes to better illustrate individual panels 160 and opening orientation of the A and B folds 162A, 162B. The logs 104A-F are shown in schematic form.

The logs 104A-F each have different weakened region spacing between adjacent weakened regions 114 along the length of web material 120 such that sheets formed between two adjacent weakened regions for each of the logs 104A-F have different sheet lengths. In these examples, the panel width of each panel is the same for all the logs. Thus, the spacing between the weakened regions 114 for the logs 104A-F differentiates the logs 104A-104F.

With reference to logs 104A and 104B in FIG. 6A, the plurality of panels 160 for each log 104 includes a leading panel 160A, a plurality of intermediate panels 160B, and a trailing panel 160C. The leading panel 160A is formed between the leading end 124 and a first fold 162F, which also happens to be a B fold 162B. The intermediate panels 160B are formed between a pair of adjacent A and B folds 162A, 162B. The trailing panel 160C is formed between a last fold 162G and the trailing end 122.

It is preferred that the length of web material forming each log 104 is such that the weakened region 114C that is broken always falls on the A-side (e.g. side with the A-folds 162A) of the logs 104. As such, the leading and trailing ends 124, 122 are always on the A-side of the logs 104 as well. Further, in some embodiments, the weakened region 114C that is broken always falls in the location where an A-fold 162A would have been formed if the web of material 102 had not been broken at the weakened region.

With reference to FIGS. 6A-6B, because the sheet delimiting apparatus 112 is controllable to form weakened regions 114 at different spacings, it allows the same folding apparatus 100 to form the different logs 104A-104F on a single machine without requiring the swapping of core components such as the cutoff mechanism or the folding rolls.

Typically, the same folding apparatus 100 would form panel widths W that are the same for each of the different log configurations 104A-104F. However, again, the user would be able to adjust the sheet lengths formed between adjacent weakened regions 114, which also includes the leading and trailing ends 124, 122.

In FIGS. 6A-6B, it can be seen that logs can now be formed with sheet lengths that do not have to correspond to an integer value of the panel width W. In particular, logs 104E has weakened regions 114 H that are not formed on the A-folds 162A or B-folds 162B but that are spaced a first distance from the A-folds 162A and a second distance from the B-folds 162B. The first and second distances in this example are different from one another. In other examples, the first and second distances could be equal. While log 104E includes weakened regions 114H, that are spaced from the A-folds 162A and the B-folds, weakened regions 114I are formed on a fold and in particular an A-fold 162A.

This configuration shows that a log can be formed that provides a sheet length (e.g. spacing between adjacent weakened regions 114) that is not an integer multiple of the panel widths W.

Log 104F is even more complex than log 104E. In this example, log 104F includes weakened region 114J that is positioned between an adjacent pair of an A-fold 162A and a B-fold 162B. The weakened region 114J is spaced a third distance from the A-fold and a fourth distance from the adjacent B-fold 162B. Further, the log 104F has a weakened region 114K that is positioned between an adjacent pair of an A-fold and a B-fold 162B. The weakened region 114K is spaced a fifth distance from the A-fold 162A and a sixth distance from the adjacent B-fold 162B. Here, the third, fourth, fifth and sixth distances are all different. As such, the weakened region 114J and weakened region 114K have different positions between their respective straddling A-fold 162A and B-folds 162B.

It is preferred that the weakened region breaker 112 is configured when forming all of the logs 104A-104F that the break (also referred to as the count) is made at a weakened region 114 that would otherwise have been located at a fold 162 and preferably at an A-fold 162A for the reasons outlined below for simplifying downstream separator componentry.

For this to happen, the minimum count (e.g. number of panels 160 in the log 104), the number of panels should be an integer multiple of the following relationship between panel width W and the spacing S between the weakened regions 114:

LCM (2*W, S)/S

Where LCM is the least common multiple.

When sheet lengths, e.g. spacing S, is an odd number of panel widths W long, the count needs to be divisible by two, this allows the separation to always occur on the same side of the stack of panels.

When sheet lengths, e.g. spacing S, is an even number of panel widths W long, the counts needs to be divisible by 1.

If the sheet lengths, e.g. spacing S, is not fully divisible by the panel width, the counts will vary based on the sheet lengths, e.g. spacing S and the panel width W.

For example, if the panel width W is 4.5 inches and the spacing S is 6 inches the count must be divisible by 3 (e.g. the number of panels 160 in the log 104 must be divisible by 3-LCM (2*4.5, 6) is 18-18 divided by spacing S of 6 results in a count that must be divisible by 3).

Figure 7:
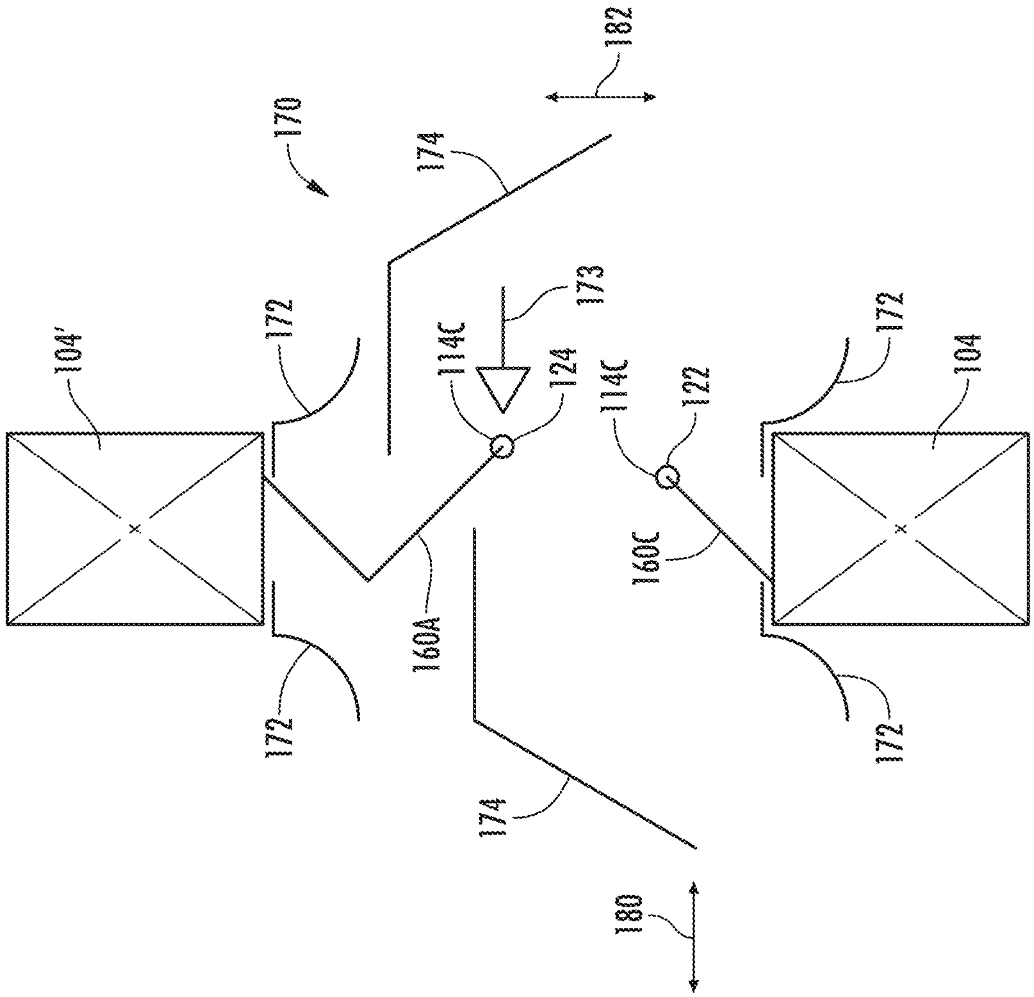
FIG. 7 is an enlarged schematic illustration of a log separator for separating logs from the building stack of sheets exiting the folding arrangement of the folding apparatus of FIG. 2.
Figure 9:
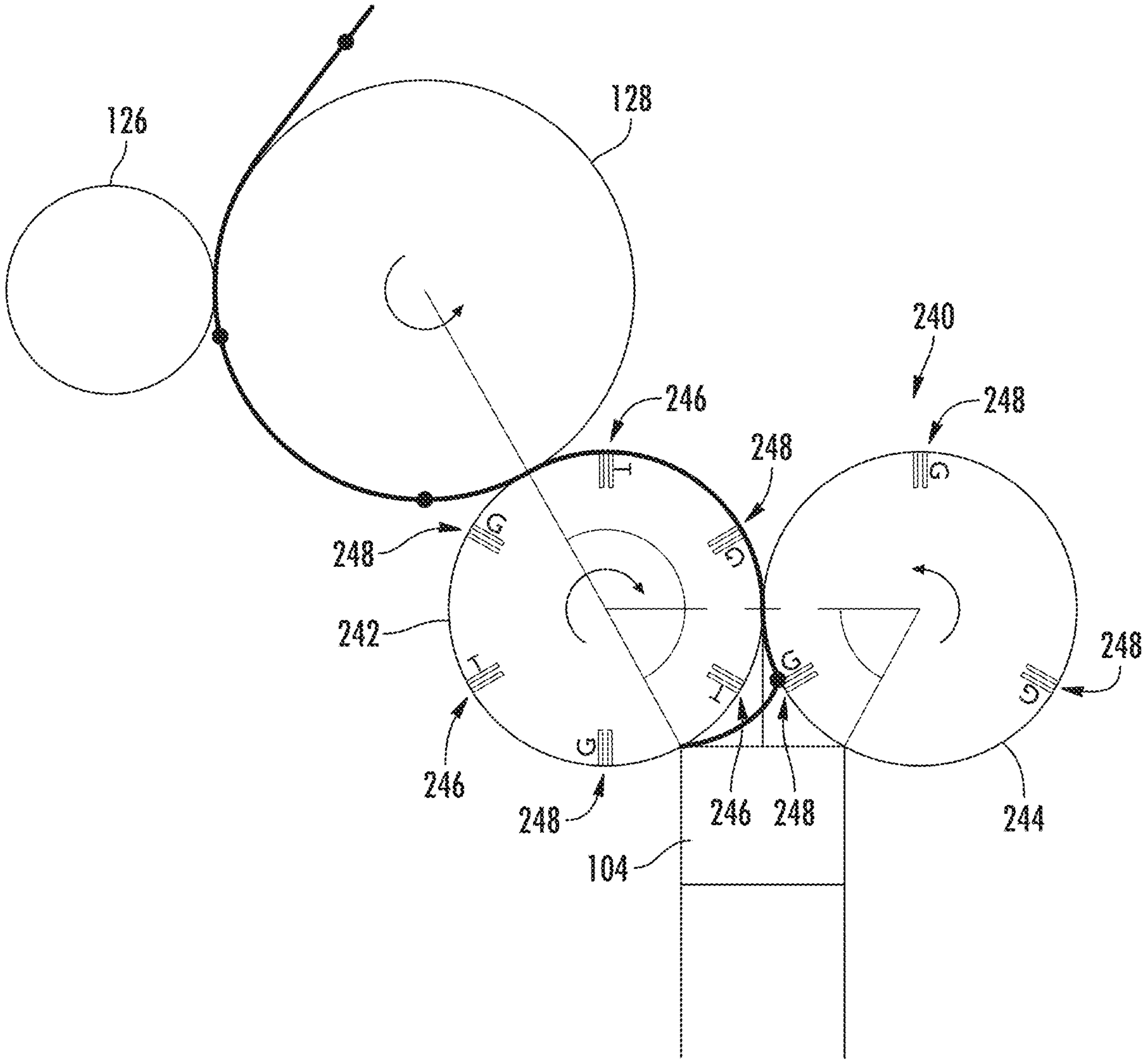
FIG. 9 is a schematic illustration of an alternative folding arrangement for folding the web of material.

FIG. 7 illustrates a separator 170 in schematic form. The separator 170 receives the zig-zag folded lengths of web material and which allows the panels of the length of web material 120 to stack on one another to form the logs 104. The separator 170 is configured to separate a first log 104 from a subsequently formed log 104' while maintaining the panels 160 of both logs 104, 104' in a proper orientation.

The separator 170 includes a plurality of count carriages 172 (four in this example) and a plurality of separator carriages 174 (two in this example) that move carried fingers into and out of the stream of panels 160 exiting the folding arrangement 140 to properly support the adjacent stacks as well as to separate the tailing panel 160C and tailing end 122 of the downstream first log 104 from the leading end 124 and leading panel 160A of the upstream second log 104'.

It is a benefit that by having the web of material 102 break with the weakened region breaker 116 at a same fold every time, e.g. an A-fold 162A or a B-fold 162B, that the carriages 172, 174 travel through a consistent path when each and every count is made between each adjacent pairs of logs 104, 104'. If the weakened regions 114 where the lengths of web material 120 were broken from the web of material 102 alternated between being located at A-folds 162A and B-folds 162B then the carriages 172, 174 would have to travel along different paths for every other separation when making the count.

The carriages 172, 174 may move the fingers in and out of the stream of stacked sheets, e.g. illustrated by the horizontal double arrow 180 and vertically toward and away from the folding arrangement 140 illustrated by vertical double arrow 182.

In this example, the web of material 102 was broken using the weakened region breaker 116 prior to the web 102 passing through the folding arrangement 140. In alternative examples, the separator 170 itself may be a weakened region breaker. In such an arrangement, the carriages 172, 174 can be configured and controlled such that they cooperate to grip the web of material 102 adjacent a weakened region 114 and then stretch the weakened region to cause it to break. This can occur as the carriages 172, 174 are separating a section of web material 102 that forms a complete log 104 from the upstream web of material that is being folded into a subsequently formed log 104.

With reference to FIG. 7, carriages could grip panel 160A of the web 102 sufficiently strong on one side of weakened region 114C while carriages 172 adjacent panel 160C of web 102 can grip the web 102 on the opposite side of weakened region 114C. The carriages can then move apart from one another while gripping the corresponding panels to break the web 102 at the weakened region 114C to separate the log from the web 102 and to thus form the length of web that forms the log 104.

In some embodiments, the first and last panel of the log may be folded to create a short panel so that the lead and/or trailing end of the log is in the middle of the width of the log. This allows for easier grasping of one of the panels when loading into a dispenser, which will typically have an access slot in the middle of the dispenser that aligns with or is proximate a middle of the log when the log is installed in the dispenser.

The separator 170 may include a mechanism for causing the folding of the lead or trailing panel to effectuate this particular fold. In some instances, an air burst can be provided by component 173. Alternatively, a mechanical means can be used.

Figure 8:
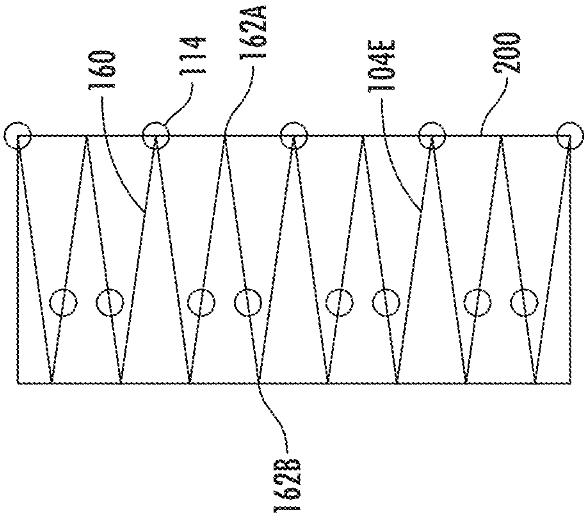
FIG. 8 is a simplified schematic illustration illustrating the use of logs within packaging and that substantially no wasted space exists.

FIG. 8 illustrates a log 104E packaged in container 200. By using the log configuration with stacked panels, each of which having substantially an identical panel width W, the container 200 can be closely sized to the dimensions of the log 104E. Here, there is a significant reduction in wasted space within the container 200 as compared to roll form web products.

Further, by using the folding apparatus 100 outlined above, a single machine can form logs 104 having a same panel width W (e.g. formed using a same folding arrangement 140) but that have different sheet lengths (e.g. spacing S between weakened regions). This allows for one supplier to supply unique or client specific product while using a single folding apparatus 100.

Again, the controller 115 allows for simply adjusting the spacing S between the weakened regions 114 and the timing at which the count is made depending on the relationship between the panel width W and the desired sheet length, e.g. spacing S.

FIG. 8 illustrates an alternative example of a folding arrangement 240 useable in the system. The folding arrangement 240 once again includes counter rotating folding rolls 242, 244. However, rather than using mechanical tuckers and grippers 246, 248 as in folding arrangement 240, folding arrangement 240 uses vacuum tuckers 246 and vacuum grippers 248. Folding roll 242 includes both vacuum tuckers 246 and vacuum grippers 248 while folding roll 244 only includes vacuum grippers 248. However, it is contemplated that both folding rolls 242, 244 may have both vacuum tuckers 246 and vacuum grippers 248 in alternative examples depending on the operation of the folding arrangement 240 and the configuration of the product exiting the folding arrangement 240.

Figure 10:
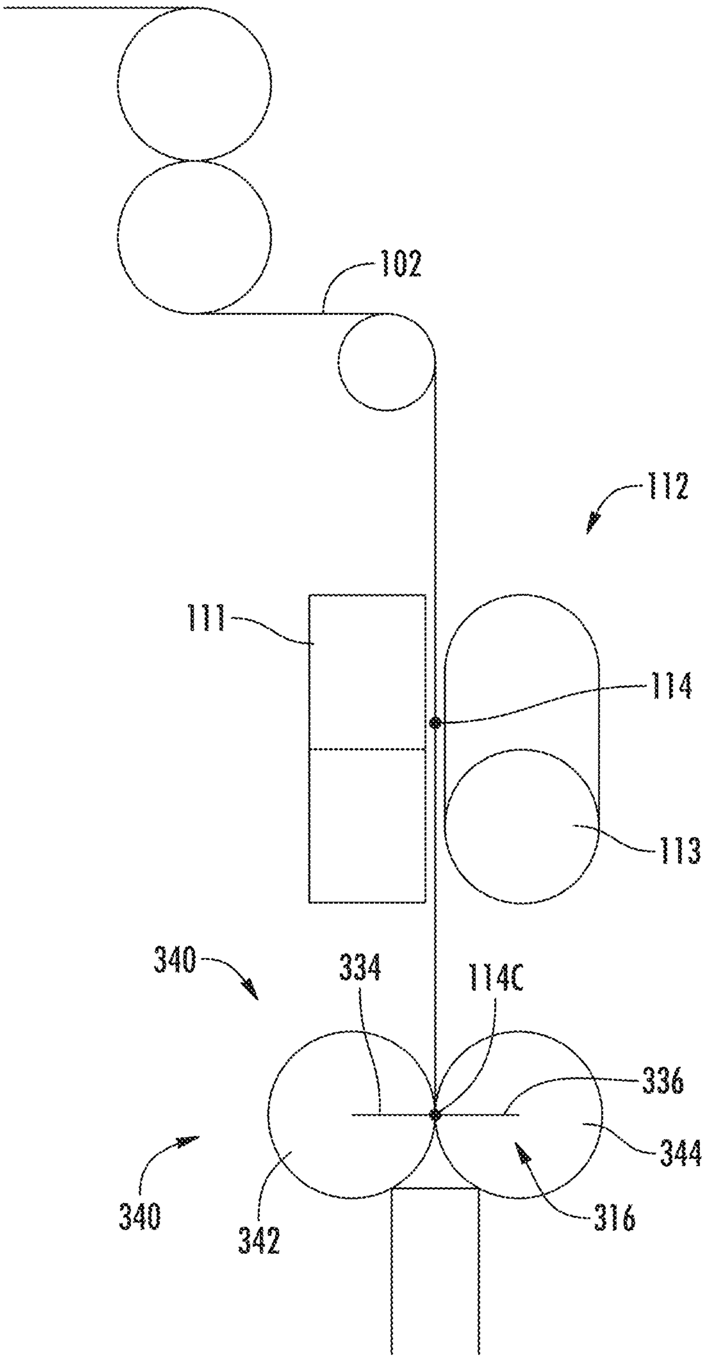
FIG. 10 is a schematic illustration of an alternative arrangement where the weakened region breaker is part of the folding arrangement.

FIG. 10 illustrates a further alternative example of a folding arrangement 340. In this example, the weakened region breaker 316 is part of the folding arrangement 340. In this example, a pair of breaker components 334, 336 are provided that break the web of material 102 at weakened region 114C as the web of material passes through the folding rolls 342, 344 of the folding arrangement 340.

The breaker components 334, 336 could be in the form of one or more projections and/or ditches provided by the folding rolls 342, 344 that stretch the web of material 102 at weakened region 114C so as to break the web of material 102. For example, a tucker, which is a projection could be one of the breaker components 334, 336. The breaker components 334, 336 could be one or more of a mechanical tucker and/or a mechanical gripper as outlined above. Further yet, only a single breaker component could be provided.

In one example, the breaker component could be another component located between the components of the folding rolls that form the folds in the web of material. For example, the breaker component could be a projection in the form of a finger that extends out of one or both of the folding rolls 342, 344 when it is time to make a count (e.g. break the web 102). The projection could be retracted when it is not time to make a count or break the web 102. The extendable finger would allow for stretching of the web 102 to break the web 102 at the desired weakened region 114C. Thus, the breaker component, in this and other examples, need not align with the weakened region 114C that is broken. The breaker components 334, 336 could be similar to components 134, 136 of FIG. 4. Again, they could be offset from the tuckers and grippers of the folding rolls angularly about the axis of rotation of the folding rolls.

Figure 11:
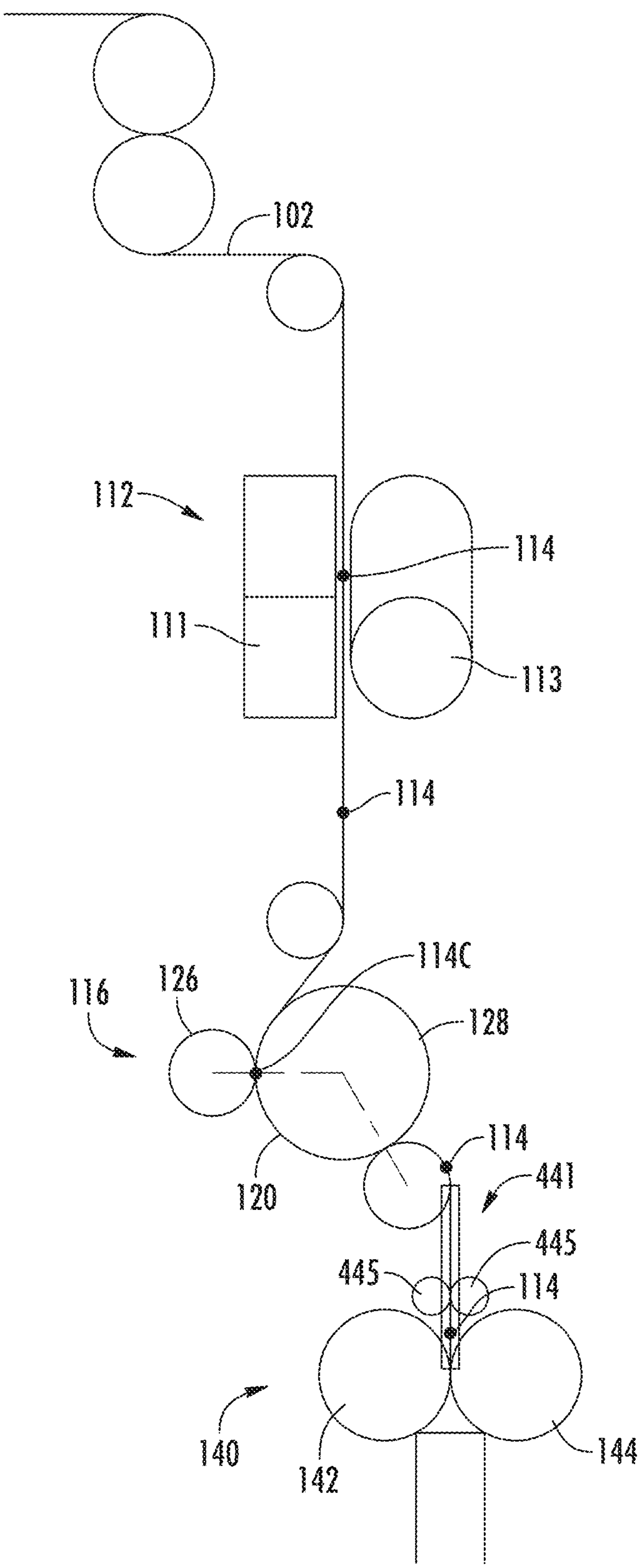
FIG. 11 is a schematic illustration of a further system that includes a guide arrangement that guides the web of material from the weakened region breaker to the folding arrangement.

FIG. 11 illustrates a further example of a system. In this example, the transfer of the web material 102 from the weakened region breaker 116 to the folding arrangement 140 has been modified. In this example, the web 102, and particularly lengths of web material 120, are not directly transferred from the weakened region breaker 116 and particularly roll 128 thereof to the folding arrangement 140. Instead, the web 102 pass through a set of guides 441 downstream from the weakened region breaker 116 and upstream of the folding arrangement 140.

Here a roll 443 is interposed between roll 128 of the weakened region breaker 116 and the guides 441. Roll 443 is used to properly orient the web 102 and particularly lengths of web 120 as they are passed into and between the pair of guides 441.

Drive rolls 445 may be provided to assist in transferring the web 102 along the guides 441. In other embodiments, the drive rolls 445 are not provided. Further yet, in some examples, the guides 441 may be provided by moving belts that form a similar path therebetween as the guides 441 illustrated in FIG. 11. In such an arrangement, the drive rolls 445 would not be needed.

It should be noted that systems can thus form the lengths of web from the web before, after or during the folding process, e.g. upstream of, with or downstream of the folding arrangement. However, once the web has passed through both the folding arrangement and the weakened region breaker, the web will have been formed into a length of web that has been removed from the continuous upstream web and will be zig-zag folded. Thus, in some instances, the breaking of the web occurs prior to zig-zag folding, during zig-zag folding, or after zig-zag folding of the web forming the log.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A folding apparatus for separating a web of material into lengths of web material and for zig-zag folding the lengths of web material to form logs, each log having a continuous zig-zag folded web of material formed from the length of web material, the continuous zig-zag folded web of material having a lead end and a trailing end, a plurality of interconnected panels including a lead panel, a trailing panel, and a plurality of intermediate panels, adjacent panels being interconnected by a fold, the lead end of the continuous zig-zag folded web of material being provided by the lead panel, the trailing end of the continuous zig-zag folded web of material being provided by the trailing panel, each log having a plurality of delimited interconnected sheets, adjacent ones of the plurality of delimited interconnected sheets being delimited by a weakened region formed in the continuous zig-zag folded web of material between the lead end and the trailing end, the apparatus comprising:

a sheet delimiting apparatus for receiving the web of material and creating weakened regions in the web of material to delimit adjacent sheets from one another, the sheet delimiting apparatus being adjustable to adjust a spacing between adjacent weakened regions to adjust a length of sheets formed in the web of material:

a folding arrangement for forming folds for zig-zag folding the web of material into a plurality of interconnected panels with adjacent panels being connected by a fold therebetween:

a weakened region breaker for breaking the web of material at selected ones of the weakened regions to separate lengths of web material from the web of material, each length of web material having a predetermined number of sheets;

wherein after passing through the folding arrangement and the weakened region breaker, each length of web material has a lead panel, a trailing panel and a plurality of intermediate panels to form each length of web material into a continuous zig-zag folded web of material.

2. The folding apparatus of claim 1, wherein the weakened region breaker is upstream of the folding arrangement such that the lengths of web material are formed prior to passing through the folding arrangement.

3. The folding apparatus of claim 2, wherein:

the folding apparatus includes a pair of counter rotating folding rolls, the counter rotating folding rolls including at least one set of a cooperating tucker and gripper for forming the folds:

the weakened region breaker breaking the lengths of web material from the web material at a weakened region that would align with the tucker having the vacuum port such that the lead end of the length of web material aligns with the vacuum port of the tucker.

4. The folding apparatus of claim 1, wherein:

the weakened region breaker is downstream from the folding arrangement; and the weakened region breaker is in the form of a log separator used to separate one log of zig-zag folded web material that has fully exited the folding arrangement from the upstream web of material passing through the folding arrangement.

5. The folding apparatus of claim 1, wherein the weakened region breaker is part of the folding arrangement.

6. The folding apparatus of claim 1, wherein the sheet delimiting apparatus and folding arrangement are configured such that:

the lead panel has a first panel width measured between the lead end and a first fold, the trailing panel has a second panel width measured between the trailing end and a last fold, each intermediate adjacent panel has a third panel width measured between adjacent folds; and the first, second and third panel widths are substantial equal.

7. The folding apparatus of claim 1, wherein the sheet delimiting apparatus and folding arrangement are configured such that the selected ones of the weakened regions where the lengths of material are separated from the web of material are formed in the web of material at locations where the folding arrangement formed or would have otherwise formed a fold.

8. The folding apparatus of claim 1, wherein:

the continuous zig-zag folded web of material forms a stack of panels after exiting the folding arrangement:

the folding arrangement forms the folds into alternating A and B folds, the A folds form one side of the stack of the panels and the B folds form an opposite side of the stack of panels, the A-folds opening towards the B folds and the B folds opening towards the A folds; and the weakened region breaker only breaks the web of material at weakened regions, which if not broken, would have formed an A fold.

9. The folding apparatus of claim 1, wherein:

the sheet delimiting apparatus forms a first weakened region between a pair of adjacent folds, the adjacent folds forming a first panel; and the first weakened region being offset from both of the folds in the pair of adjacent folds forming the first panel.

10. The folding apparatus of claim 1, wherein the sheet delimiting apparatus is configured to create the weakened regions at a spacing that is not an even multiple of the first panel width defined between adjacent folds.

11. The folding apparatus of claim 1, wherein the sheet delimiting apparatus is a perforator.

12. The folding apparatus of claim 1, wherein:

the weakened region breaker is in the form of a roll configured to interact with the web of material and break the web of material at a selected weakened region; and the weakened region breaker includes an oversped pad to accelerate a portion of the web of material downstream of the weakened region to stretch the web of material and to break the weakened region.

13. The folding apparatus of claim 1, wherein:

the weakened region breaker is in the form of a roll configured to interact with the web of material and break the web of material at a selected weakened region; and the weakened region breaker includes a finger or knife extending out of the roll that breaks the web of material at the selected weakened region.

14. The folding apparatus of claim 1, wherein:

the weakened region breaker is in the form of a roll configured to interact with the web of material and break the web of material at a selected weakened region; and the weakened region breaker includes a finger or knife extending out of an adjacent roll that extends into a groove on the roll to push the selected weakened region into the groove to break the continuous web of material.

15. The folding apparatus of claim 1, wherein:

each panel has a panel width measured generally perpendicular to an adjacent fold:

the weakened region breaker breaks the web of material such that the corresponding lengths of web material have a predetermined number of sheets;

when the spacing between adjacent weakened regions is an even number of panel widths, the predetermined number of sheets is a multiple of 1;

when the spacing between adjacent weakened regions is an odd number of panel widths, the predetermined number of sheets is a multiple of 2;

when the spacing between adjacent weakened regions is not an integer multiple of the panel width, the predetermined number of sheets must be a multiple of the least common multiple of (2*the panel width, the spacing) divided by the spacing.

16. A method of forming a log of continuous zig-zag folded web of material comprising:

feeding a web of material to the apparatus of claim 1;

forming, using the sheet delimiting apparatus, first weakened regions in the web of material, the first weakened regions being formed at a first spacing to define sheets of a first sheet length;

zig-zag folding, with the folding arrangement, the web of material having the first weakened regions into a plurality of interconnected panels;

breaking, with the weakened region breaker, the web of material at selected ones of the first weakened regions forming a first plurality of separate lengths of web material from the web of material, each length of web material of the first plurality of separate lengths of web material having a plurality of sheets of the first sheet length;

wherein the plurality of interconnected panels of each of the first plurality of separate lengths of web material includes a lead panel, a trailing panel and a plurality of intermediate panels to form each length of web into a continuous zig-zag folded web of material, adjacent panels being connected by a fold therebetween, the intermediate panels having a panel width;

forming, using the sheet delimiting apparatus, second weakened regions in the web of material, the second weakened regions being formed at a second spacing to define sheets of a second sheet length, the second spacing being different than the first spacing;

zig-zag folding, with the folding arrangement, the web of material having the second weakened regions into a plurality of interconnected panels;

breaking, with the weakened region breaker, the web of material at selected ones of the second weakened regions forming a second plurality of separate lengths of web material from the web of material, each length of web material of the second plurality of separate lengths of web material having a plurality of sheets of the second length; and wherein the plurality of panels of each of the second plurality of separate lengths of web material includes a lead panel, a trailing panel and a plurality of intermediate panels to form each length of web into a continuous zig-zag folded web of material, adjacent panels being connected by a fold therebetween, the intermediate panels having a panel width equal to the panel width of the intermediate panels of the first length of web material.

17. The method of claim 16, further comprising:

adjusting operation of the sheet delimiting apparatus to adjust between the first and second spacing.

18. The method of claim 16, wherein forming the first weakened regions in each first length of web material includes forming a first offset weakened region between the leading panel and the last panel, the first offset weakened region being located between and offset from a first adjacent pair of folds.

19. The method of claim 18, wherein:

the first adjacent pair of folds between which the first offset weakened region is formed includes a first fold and a second fold:

the first offset weakened region is spaced a first distance from the first fold; and the first offset weakened region is spaced a second distance from the second fold.

20. The method of claim 19, wherein the second distance is different than the first distance.

21. The method of claim 20, wherein forming the second weakened regions includes forming a second offset weakened region formed between and offset from a second adjacent pair of folds including a third fold and a fourth fold:

wherein:

the second offset weakened region is spaced a third distance from the third fold:

the second offset weakened region is spaced a fourth distance from the fourth fold; and the third and fourth distances being different than first and second distances.

22. A method of forming a log of continuous zig-zag folded web of material comprising:

forming, using a sheet delimiting apparatus, first weakened regions in the web of material, the first weakened regions being formed at a first spacing to define sheets of a first sheet length;

zig-zag folding, with a folding arrangement, the web of material into a plurality of interconnected panels, adjacent panels being connected by a fold therebetween;

breaking, with a weakened region breaker, the web of material at selected ones of the first weakened regions forming a first plurality of separate lengths of web material from the web of material, each length of web material of the first plurality of separate lengths of web material having a plurality of sheets of the first sheet length;

wherein the plurality of interconnected panels of each of the first plurality of separate lengths of web material including a lead panel, a trailing panel and a plurality of intermediate panels to form each length of web into a continuous zig-zag folded web of material, the lead panel having a first panel width measured between the lead end and a first fold, the trailing panel having a second panel width measured between the trailing end and a last fold, each intermediate adjacent panel having a third panel width measured between adjacent folds, the first, second and third panel widths are substantially equal; and wherein forming the first weakened regions in each first length of web material includes forming a first offset weakened region between the leading panel and the last panel, the first offset weakened region being located between and offset from a first adjacent pair of folds.

23. The method of claim 22, wherein:

the first adjacent pair of folds between which the first offset weakened region is formed includes a first fold and a second fold;

the first offset weakened region is spaced a first distance from the first fold; and the first offset weakened region is spaced a second distance from the second fold; and the second distance is different than the first distance.

24. The method of claim 16, wherein at least the intermediate panels of the first lengths of web material have the same panel widths as the intermediate panels of the second lengths of web material.

* * * * *